United States Patent [19]
Stuart

[11] Patent Number: 6,119,992
[45] Date of Patent: *Sep. 19, 2000

[54] SCREW FASTENER CLAMP

[75] Inventor: Timothy Scott Stuart, Potomac, Md.

[73] Assignee: Stuart Shelving, LLC, Potomac, Md.

[*] Notice: This patent issued on a continued prosecution application filed under 37 CFR 1.53(d), and is subject to the twenty year patent term provisions of 35 U.S.C. 154(a)(2).

[21] Appl. No.: 09/137,891

[22] Filed: Aug. 20, 1998

Related U.S. Application Data

[60] Provisional application No. 60/057,230, Aug. 29, 1997, provisional application No. 60/061,045, Oct. 4, 1997, and provisional application No. 60/064,042, Nov. 3, 1997.

[51] Int. Cl.[7] .............................. A47B 96/06; E04G 5/06; E04G 3/00; F16B 1/00; G09F 7/18
[52] U.S. Cl. ........................... 248/231.71; 248/230.6; 248/228.6
[58] Field of Search .................. 248/228.6, 230.6, 248/231.71, 229.15, 229.25; 242/382

[56] References Cited

U.S. PATENT DOCUMENTS

| | | |
|---|---|---|
| 305,863 | 9/1884 | Thompson . |
| 338,288 | 3/1886 | Normandy . |
| 388,674 | 8/1888 | Harrington . |
| 436,704 | 9/1890 | Green . |
| 452,673 | 5/1891 | Hunter . |
| 587,101 | 7/1897 | Lombard et al. . |
| 607,890 | 7/1898 | Smith . |
| 607,891 | 7/1898 | Smith . |
| 668,761 | 2/1901 | Roseboom . |
| 679,054 | 7/1901 | Kraushaar . |
| 746,188 | 12/1903 | Sonsthagen . |
| 834,849 | 10/1906 | Rollman . |
| 934,676 | 9/1909 | Langslow . |
| 1,108,692 | 8/1914 | Burd . |
| 1,194,943 | 8/1916 | Broling . |
| 1,224,127 | 5/1917 | Bartlett . |
| 1,641,690 | 9/1927 | Piscator . |
| 1,675,269 | 6/1928 | Hine . |
| 2,136,109 | 11/1938 | Kress . |
| 2,946,457 | 7/1960 | Pierce . |
| 3,262,666 | 7/1966 | Solum ................................. 248/226 |
| 3,744,645 | 7/1973 | Hochman . |
| 3,776,388 | 12/1973 | Mattheis . |
| 3,949,880 | 4/1976 | Fortunato . |
| 4,019,705 | 4/1977 | Habuda, Sr. et al. ............ 248/58 |
| 4,844,397 | 7/1989 | Skakoon et al. ............. 248/231.71 |
| 5,351,922 | 10/1994 | Lindsay ........................ 248/188.5 |
| 5,655,670 | 8/1997 | Stuart . |

FOREIGN PATENT DOCUMENTS

| | | | |
|---|---|---|---|
| 806022 | 12/1958 | United Kingdom ............ 248/228.6 |

*Primary Examiner*—Ramon O. Ramirez
*Assistant Examiner*—Jerome A. DeLuca

[57] ABSTRACT

A screw fastener clamp which can be securely mounted at selected locations along a shelf or similar structure includes a screw fastener, a rachet latch, a body member containing a slot for receiving the shelf, and a retaining portion for supporting such items as book stops, lamps and sign holders. Latch release means and means to prevent unauthorized use of said latch release means are disclosed, as is a separate retaining member positioned between the body portion and the shelf which allows the use of separate body member and retainer components and thus allowing these parts to be interchanged as desired for specific applications. Also disclosed is a screw fastener clamp having retaining means fastened to the screw fastener stud such that rotating said retaining means tightens the grip of said clamp on the shelf.

21 Claims, 13 Drawing Sheets

SCREW FASTENER CLAMP

SPECIFICATION

This patent application references Stuart (U.S. Pat. Nos. 5,655,670 and 6,044,982) and claims the benefits of U.S. Provisional Patent Applications by Stuart (No. 60/057,230 filed Aug. 29, 1997; No. 60/061,045 filed Oct. 4, 1997; and No. 60/064,042 filed Nov. 3, 1997).

BACKGROUND OF THE INVENTION

Items such as sign holders, book stops, partitioning dividers, pencil sharpeners, lamps, binding and trays are often attached to objects such as shelves, desktops, and bookcases. The problem of firmly but reversibly fastening such items to shelves and the like is a longstanding problem.

The present invention relates to a clamp utilizing a screw fastener to firmly but reversibly attach such items to shelves and the like at a selected location.

BRIEF DESCRIPTION OF THE PRIOR ART

Various clamps for attaching sign holders, book stops, partitioning dividers, pencil sharpeners, lamps, and similar items to shelves, desks, bookcases and the like are described in the patented prior art. The Normandy U.S. Pat. No. 338,288, for example, discloses a clamp with a non-latching screw fastener for attaching a clothes drying rack to a shelf, while Lombard and Maynard U.S. Pat. No. 587,101 discloses a shelf bracket with a non-latching screw fastener.

The Thompson U.S. Pat. No. 305,863, Harrington U.S. Pat. No. 388,674, and Hunter U.S. Pat. No. 452,673 disclose clip-on type partitions and bookends. These clip-on bookends engage the edge of a bookshelf and are generally formed as an integral unit including a base portion, a resilient clip portion, and a book support portion. The resilient clip portion releasably secures the support portion to the bookshelf and the support portion bears against a row of books. The clips for these bookends often extend a great distance along the bottom of the shelf in order to provide structural support and to provide a tight grip on the shelf. The clip, however, is often unsightly and in some cases, significantly protrudes from the underside of the shelf, thus interfering with the use of the space below the shelf. Another drawback of clip-on bookends is that they generally do not provide a strong connection with the shelf and tend to slip, particularly when supporting heavy loads, such as large books.

Book supports using a thumb screw or cam are disclosed in the Smith U.S. Pat. Nos. 607,890 and 607,891. These devices use a clamp arranged under the shelf and a thumb screw or cam which tightens the support in place by pressing a block against the top of the shelf. The problem with this type of bookend is that the locking arrangements are overly complicated and unsightly and the thumb screws tend to loosen over time. These bookends are not believed to be in commercial use.

The use of a non-latching screw fastener in a clamp for racks and the like was disclosed in the Langslow U.S. Pat. No. 934,676, while the use of a non-latching screw fastener with a dining table attachment was disclosed in the Burd U.S. Pat. No. 1,108,692. The use of a non-latching screw fastener to hold a display tray to a shelf was disclosed in the Mattheis U.S. Pat. No. 3,776,388.

A number of others have disclosed clamps with non-latching screw fasteners. For example, the Rollman U.S. Pat. No. 834,849 shows a body member with a retaining portion for item support and a C-shaped configuration defining a slot for receiving the edge of a table, and a threaded-clamping screw to fasten the body member to said table. The Sonsthagen U.S. Pat. No. 746,188 shows a body member with a retaining portion for item support and a C-shaped configuration and a screw fastener fasten the body member to the bed post. The Great Britain Patent to Walsh and Co. No. 806,022 discloses a box-like bracket for suspending members from girders. The body member has a generally C-shaped retaining portion and a screw fastener connected to a leg portion. The Broling U.S. Pat. No. 1,194,943 discloses a device which is adapted to be secured to a sewing machine or sewing table to hold cloth. The body member is U-shaped and a thumb screw connected to the lower leg rotatably protrudes a stud into a slot. The Piscator U.S. Pat. No. 1,641,690 discloses a bracket for attaching an electric switch to the instrument board of an automobile. At least portions of the bracket body are C-shaped. A thumb screw is connected to one of the legs and rotatably protrudes a stud into a slot. The Solum U.S. Pat. No. 3,262,666) discloses a copy holder with a C-shaped body. A screw spindle is connected to the lower leg and rotatably protrudes a stud into a slot. The Lindsay U.S. Pat. No. 5,351,922 discloses a clamp with a bridge piece connected to a body housing by a shaft. The article to be clamped, e.g., telescoping legs of a camera tripod, is held between said body and said bridge piece and pressure is exerted on the article to be clamped by rotating said shaft. Lindsay also shows a mechanism for holding the threaded member relatively captive so that it cannot be completely unscrewed. This mechanism includes gears with radial teeth, a spring, an arcuate recess and internal end face in an annular member and an abutment and internal radial face in the circular cavity in the housing.

The problem with non-latching screw fasteners is that they tend to loosen over time, and in an attempt to overcome this shortcoming, users may tend to over tighten the screw fastener and thus cause damage to the surfaces in contact with the screw fastener. A latching screw fastener is thus preferred, particularly for screw fastener clamps used for heavy duty use or used to fasten items for an extended period of time. A latch for a screw fastener was disclosed in the Habuda, Sr. et al. U.S. Pat. No. 4,019,705 as part of an apparatus for suspending a pipe from a structural member such as a beam. A screw fastener connected to a lower leg portion rotatably protrudes a stud into the slot to fasten the body member to a beam. The apparatus includes latching and latch release means for the screw fastener consisting of a lock nut on a set screw. However, the set screw and lock nut are not convenient to use in that they would need to be tightened or released using a wrench or similar tool.

The Skakoon, et al. U.S. Pat. No. 4,844,397 describes an intravenous pole clamp with a locking mechanism which employs a spring clutch. The body member has an attachment for a medical device and a chamber for receiving an I-V pole. In the locked position, the threaded stud can rotate inwardly but if it is attempted to rotate it outwardly the spring clutches the threaded stud and hinders its outward rotation. This locking mechanism, while allowing fine adjustment of the clamp, does not provide the strength of the locking action provided by the present invention, since a spring clutch can slip under pressure.

A clamping bookend has recently been disclosed in a Stuart U.S. Pat. No. 5,655,670. The clamping bookend overcomes many of the drawbacks of earlier bookends and is suitable for use as a bookend, partition, and as a support for banding and binning. A clamp recently disclosed by Stuart (U.S. Pat. No. 6,044,982) uses a lever or clamping member to reversibly attach items such as dispensers and lamps to a shelf.

The present invention was developed in order to provide a clamp utilizing a screw fastener for firmly and reversibly attaching items such as sign holders, book stops, partitioning dividers, pencil sharpeners, and dispensers to shelves, desktops, bookcases and the like at a selected location. This screw fastener clamp is equipped with a ratchet latch for ensuring the screw fastener remains in the tightened position. Means are provided to release the latch and prevent unauthorized release of said latch. A separate retaining member is also disclosed. Having separable body member and retainer components allows a standardized body member to be easily and inexpensively manufactured and different retaining members to be used interchangeably with the standardized body member. This provides additional flexibility for shipping, storage, packaging, and display. In addition, this approach allows consumers to "mix and match" components as desired for a specific application.

Said clamp may be mounted and removed without damaging the shelf or the objects held or displayed; can be easily mounted on and removed from existing shelves; requires a minimum of shelf space; does not significantly interfere with the use of the space beneath the shelf; [and] is attractive and suitable for use in homes, offices, or public areas of a store; and can be securely mounted on a shelf to support and display heavy objects.

SUMMARY OF THE INVENTION

Accordingly, it is a primary object of the present invention to provide a clamp for firmly and reversibly attaching items such as sign holders, book stops, partitioning dividers, binding, pencil sharpeners, trays, lamps and dispensers to shelves, desks, bookcases and the like at a selected location.

It is also a more specific object of the invention to provide a clamp having a body member containing a slot for receiving the shelf or similar object; a retaining portion for supporting items such as pencil sharpeners, book stops or sign holders; and at least one screw fastener with a stud that protrudes into said slot, engages the shelf and holds the clamp firmly to said shelf.

It is a further object of the invention to provide a screw fastener clamp with a latch, latch release, and means for preventing unauthorized release of the latch.

It is a further object of the invention to provide a screw fastener with a latch that engages when said screw fastener clamp moves into the tightened, closed, or operative position, thereby allowing for a more compact latch.

It is a further object of the invention to provide a clamp having a screw fastener wherein the body member is formed in different embodiments suitable for firm and reversible attachment to different types of objects, including wire shelves, metal shelves, and wooden shelves.

It is another object of the invention to provide a screw fastener clamp in which the retaining member and the body member are formed as separate components, thereby allowing these parts to be interchanged as desired for specific applications.

It is another object of the invention to provide a screw fastener clamp in which the retaining member is formed as one piece with the screw fastener stud such that rotating said retaining member rotates the stud and thus tightens or loosens the grip of the clamp on the shelf.

It is a further object of the invention to provide a clamp with a screw fastener that can be used with a clamping bookend having a flex member at the lower end of the clamping member so as to increase the grip of the bookend.

It is another object of the present invention to provide a screw fastener clamp that is easily and inexpensively manufactured, durable and easy to operate.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
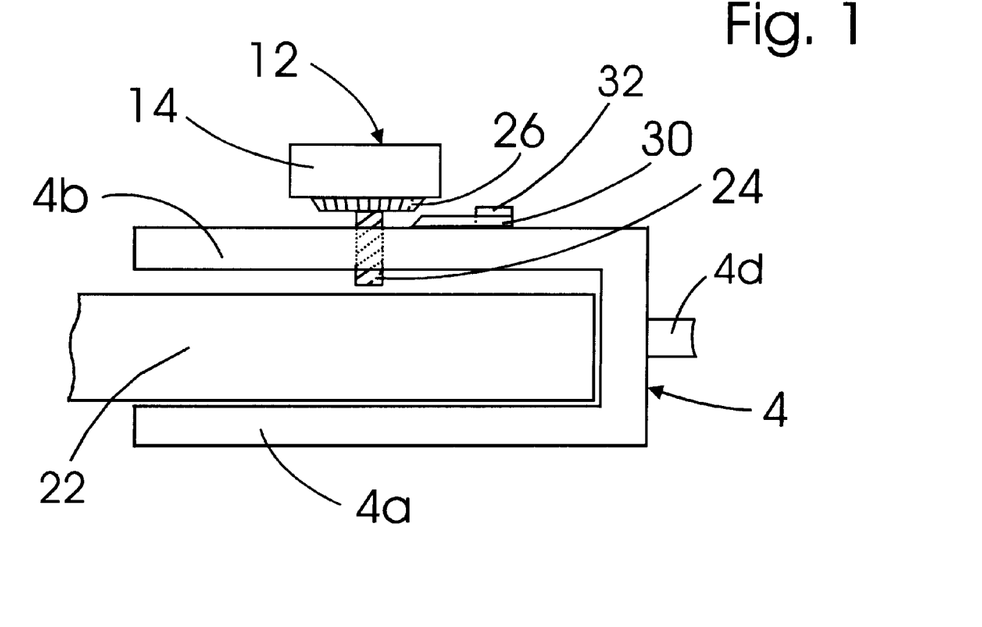
FIG. 1 is a side view of a screw fastener clamp having a screw fastener with a rachet latch.
Figure 2:
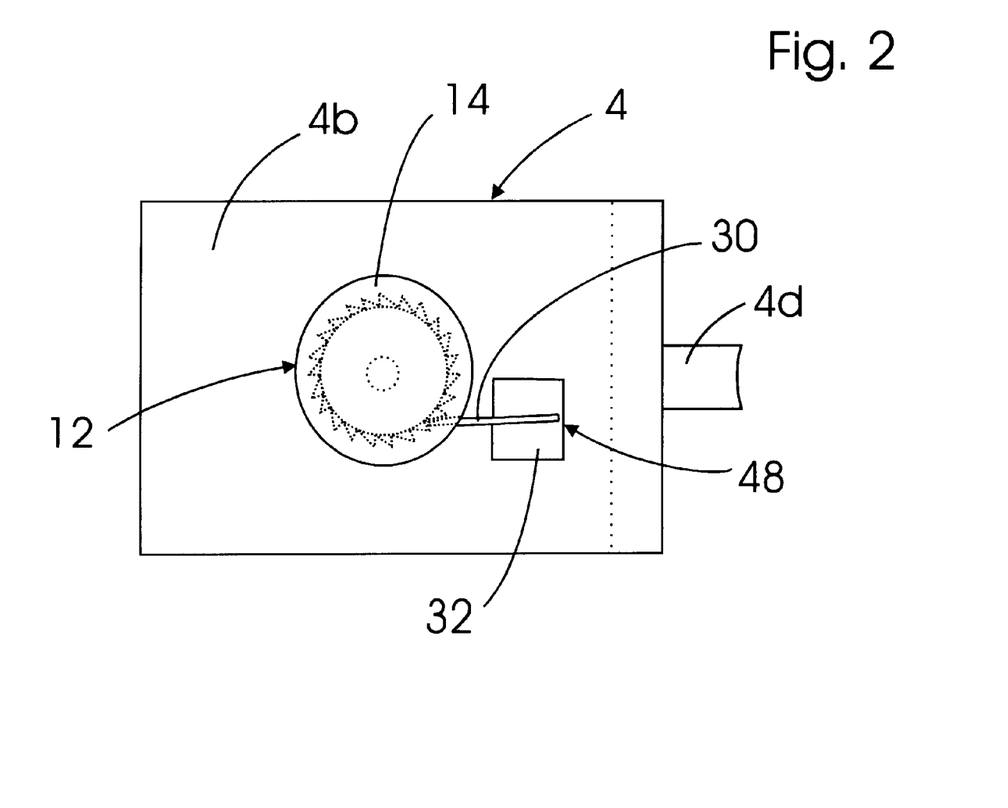
FIG. 2 is a top view of the screw fastener clamp of FIG. 1.

Referring first to FIGS. 1 and 2, there is shown a screw fastener clamp having a body member 4 and a screw fastener 12. Said body member 4 includes a lower leg portion 4a, an upper leg portion 4b which is generally parallel to leg portion 4a, a connecting portion 4c, and a retaining portion 4d. Leg portions 4a, 4b and connecting portion 4c define a slot 10 which receives a shelf 22 therein. The screw fastener 12 rotates in a threaded opening in the upper leg portion 4b and reversibly presses against the shelf.

Said screw fastener is equipped with a rachet latch 48 consisting of a rachet wheel 26, spring 30, and a spring mount 32 to reversibly retain said screw fastener in the tightened or operative position after rotation. The body member, screw fastener and latch are formed of a strong durable material such as metal or plastic. Said rachet wheel is generally formed as an integral unit with the screw fastener knob 14, while said spring is connected to said spring mount which is connected to said body member. Said spring is oriented so that it presses against the teeth of said rachet wheel. The end of said spring that engages the teeth of said rachet wheel is oriented so as to allow free rotation of said rachet wheel, and thus the rotation of the connected screw fastener stud 24, in the direction that moves the stud toward the shelf 22, i.e., as the grip is increased and the clamp is installed. However, said spring does not allow free rotation of the stud in the direction that moves the stud away from said shelf, i.e., as the grip is reduced. Rotation in this direction is only feasible by moving the end of said spring so as to release said spring from the teeth of said rachet wheel.

Since, during rotation of the screw fastener knob, said rachet wheel moves relative to said spring, in this favored embodiment, said teeth of said rachet wheel 26, and the free end of spring 30 are beveled so that they mesh and engage when said rachet wheel moves into a position corresponding to the tightened, closed or operative position, The use of a beveled rachet wheel and spring provides a compact form, and is particularly suitable for applications involving a fairly uniform shelf thickness, e.g., standardized shelving.

The operation of clamp shown in FIGS. 1–2 will now be described. With the screw fastener knob 14 rotated so that the screw fastener stud 24 does not significantly protrude into the slot 10, the body member 4 is placed on a shelf 22 or similar structure. The body member is sized such that said slot is slightly larger than the thickness of the shelf and the shelf fits loosely within said slot. Once placed on the shelf, said screw fastener knob is rotated so that the end of said screw fastener stud extends into said slot and engages the surface of the shelf, thereby wedging said shelf between the end of the stud and the leg portion of said body member. As the screw fastener 12 is rotated, said body member is pushed against the shelf, thus forming a tight fit between said shelf and said body member and securely fastening the clamp to said shelf at a selected location. Rotating said knob also rotates the rachet wheel 26. The spring 30 and spring mount 32 keep said rachet wheel in the tightened position.

The grip generated by said screw fastener is sufficient to firmly maintain the clamp on said shelf without marring or otherwise damaging said shelf. It will be recognized that the grip on said shelf can be varied by changing the diameter of the knob since, when the screw fastener is operated by hand, the larger the diameter of said knob, the greater the amount of force that can be provided by said knob to said stud. Also, the amount of force transmitted to each unit of surface area of the engaged surface of the shelf by said stud can be regulated by changing the diameter of said stud, since increasing the diameter of said stud distributed the force transmitted by said stud over a larger surface area. In addition, the grip generated by said screw fastener can be increased by increasing the roughness of the end of said stud which engages the shelf. The use of a pad for ensuring that a screw fastener does not mar or otherwise damage the shelf is discussed below.

It will be recognized that the clamp may also be used in an inverted position, if desired, for example, to support a partitioning divider or book stop for books or other objects on a shelf located beneath the shelf on which the clamp is mounted.

Figure 3:
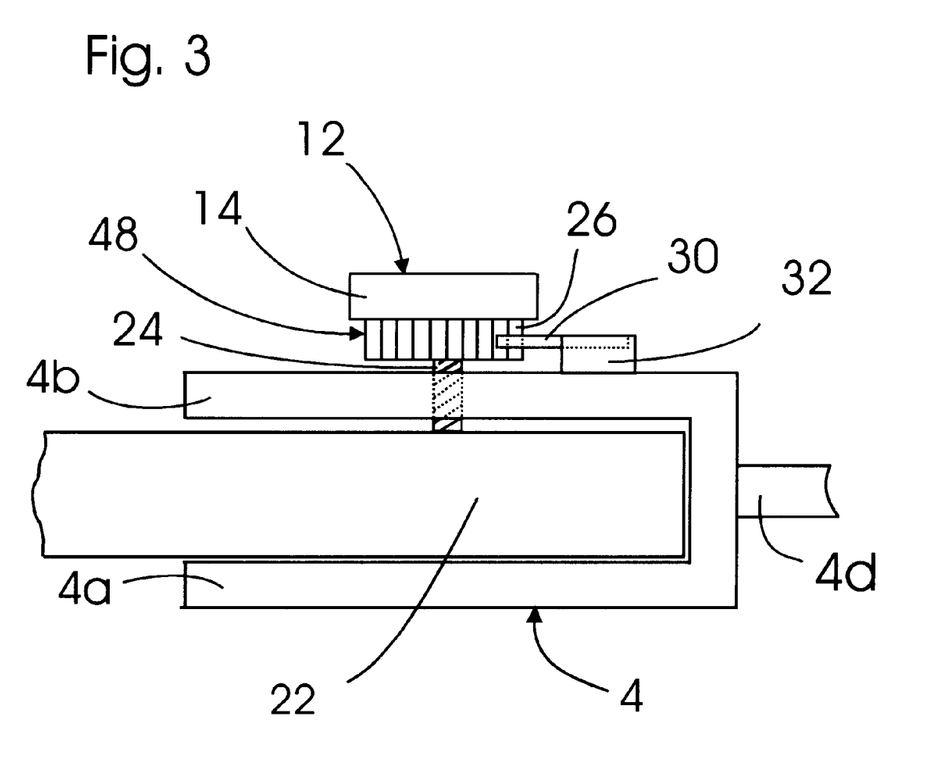
FIG. 3 a side view of a screw fastener clamp showing an alternative embodiment for a rachet latch.

FIG. 3 shows an alternative approach for the latch for a screw fastener 12 in which said rachet wheel and said spring are formed such that they stay engaged during the operational length of travel of said stud. The embodiment shown in FIG. 3 shows a rachet wheel that is wider than the spring, allowing for relative movement between said rachet wheel and said spring. Due to its ability to latch the stud over a larger operational length of travel of said stud, this embodiment would be suitable for applications involving shelving of various thicknesses.

Figure 4:
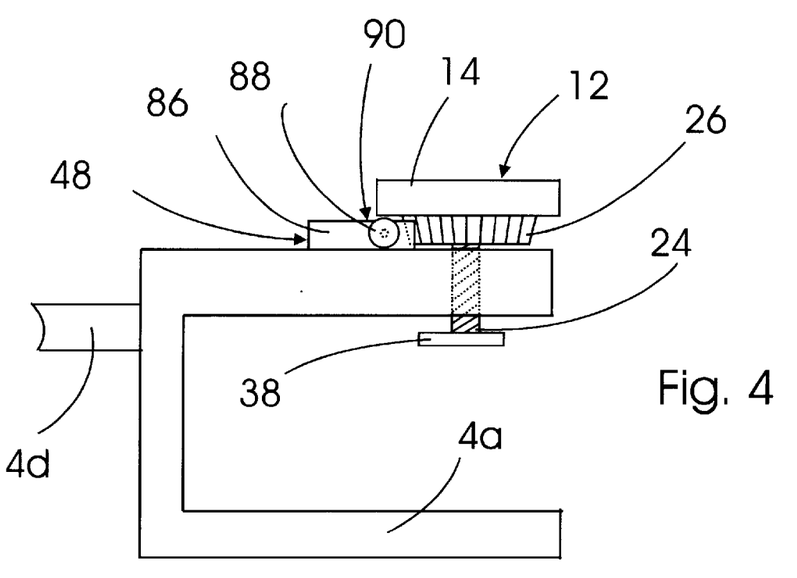
FIG. 4 is a side view of a screw fastener clamp having a rachet latch and latch release.
Figure 5:
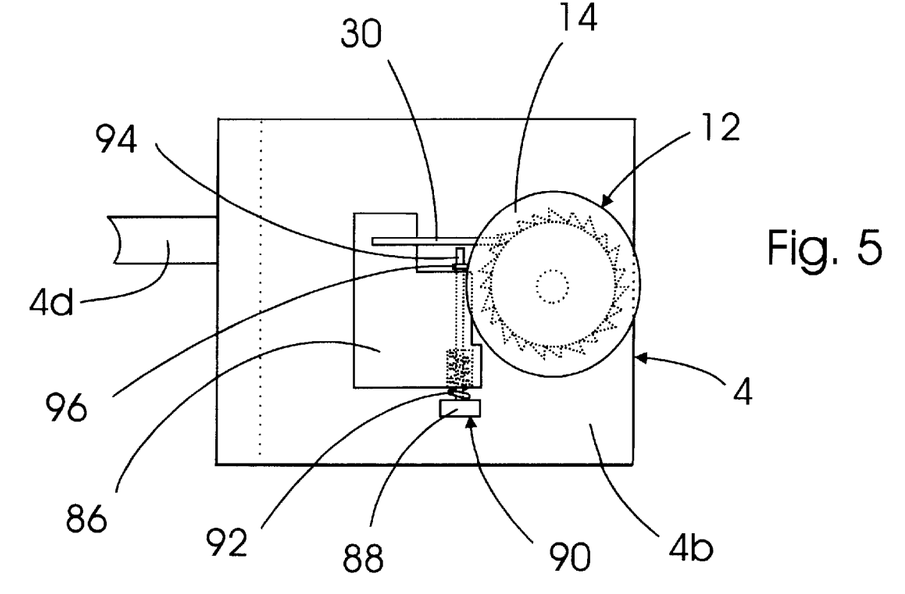
FIG. 5 is a top view of the clamp of FIG. 4.

FIGS. 4 and 5 show a screw fastener clamp with a body member 4, screw fastener 12, rachet latch 48 and latch release mechanism 90 for said latch. The latch release mechanism 90 consists of a latch release button 88, a latch release pin 94, a latch release pin stop 96, a conventional helical spring 92 and a latch release and spring mount 86. The button 88 and pin 94 are formed as a unit and said pin projects through an opening in the latch release and spring mount 86 such that the pin rests against the spring 30. The latch release is operated by manually pressing the latch release button 88 which presses the latch release pin into the spring 30, displacing said spring away from the rachet wheel 26 and thus allowing the rachet wheel to be rotated so as to loosen the screw fastener. Once the screw fastener is loosened, the button 88 is released and the conventional spring 92 returns the latch release pin 94 to its original position thus allowing the spring 30 to return to its original latching position against the rachet wheel 26. The pin stop 96 prevents the conventional spring 92 from moving the pin 94 and button 88 beyond their original position relative to the latch release and spring mount 86.

Figure 6:
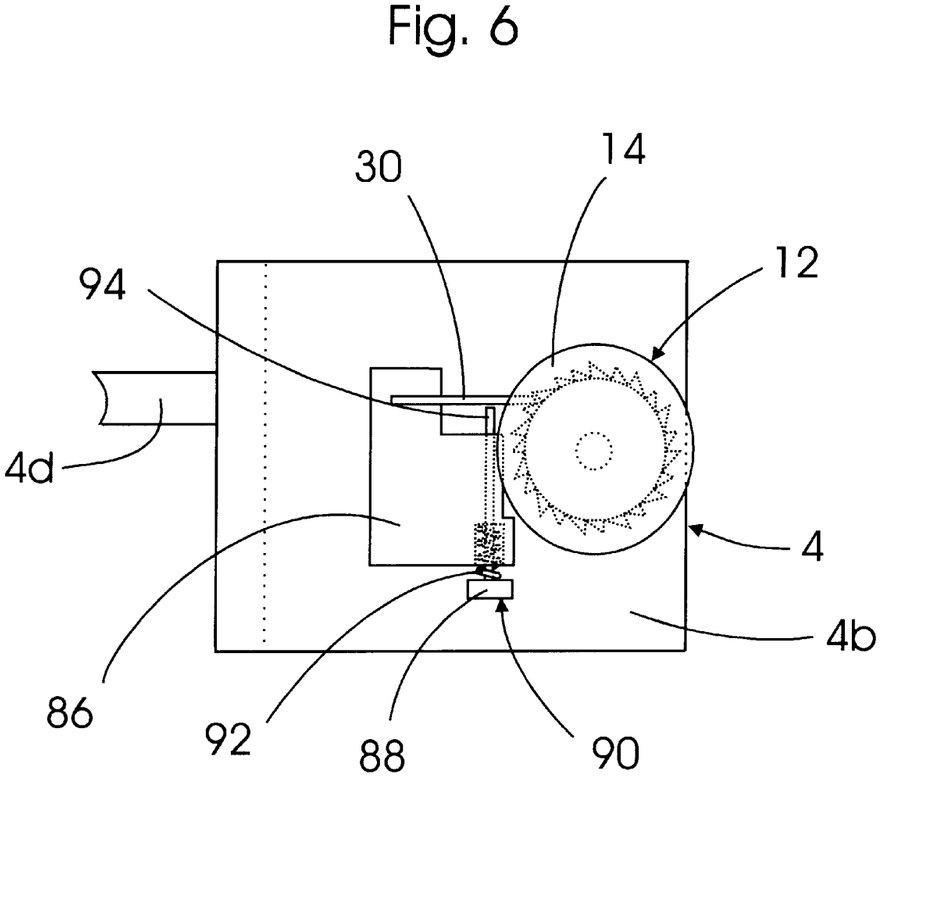
FIG. 6 is a top view of the clamp of FIG. 5 with a removable latch release pin.

As shown in FIG. 6, the pin stop 96 could be omitted to allow for the removal of the latch release pin 94 and latch release button 88 and thus help prevent unauthorized loosening or unlatching of the latching screw fastener, e.g., when used in a public location such as a store.

Figure 7:
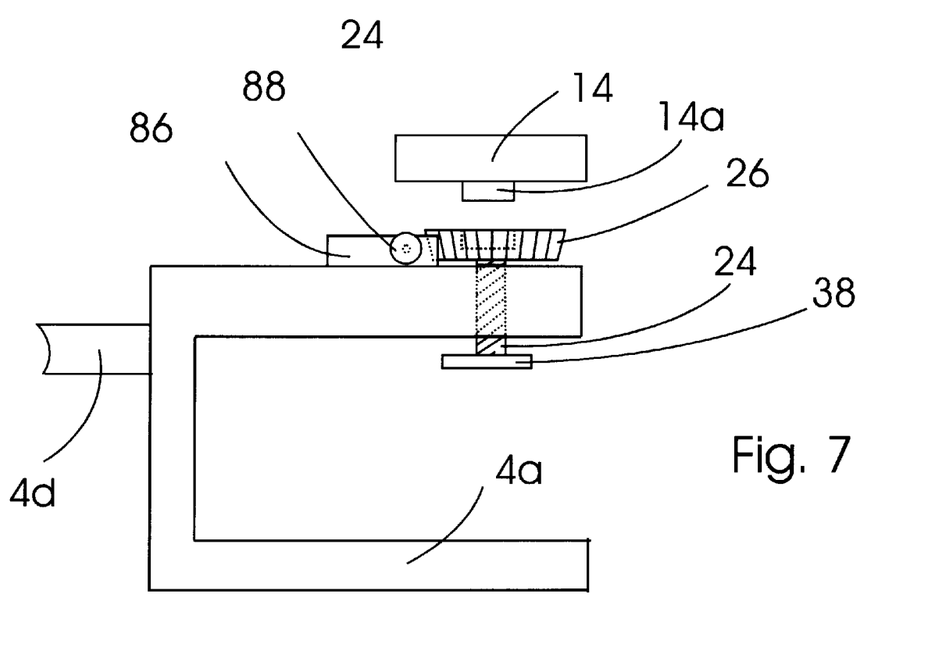
FIG. 7 is a side view of a screw fastener clamp having a detachable screw fastener knob.

FIG. 7 shows an alternative approach for preventing unauthorized unlatching of the latching screw fastener. In this embodiment, the screw fastener knob 14 used for rotating the screw fastener latch is formed as a separate piece with a protrusion 14a that, during installation and removal of the screw fastener, is placed into a matching opening 26a in the rachet wheel 26 so that rotating said knob would also rotate said rachet wheel. The screw fastener knob 14 would be removed and stored in a secure location once the screw fastener was installed.

Figure 8:
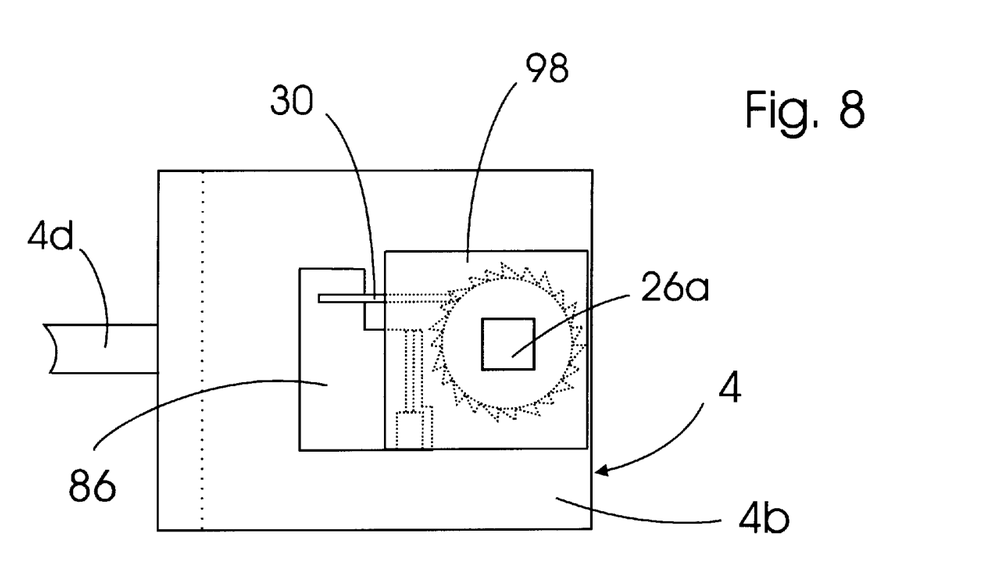
FIG. 8 is a top view of a screw fastener clamp with a cover enclosing a latch release mechanism.

As shown in FIG. 8, if even greater security is desired, the latch release 90 can be enclosed in a cover 98 with openings provided for the insertion of the screw fastener knob 14 and latch release pin 94 during removal of the clamp.

Figure 9:
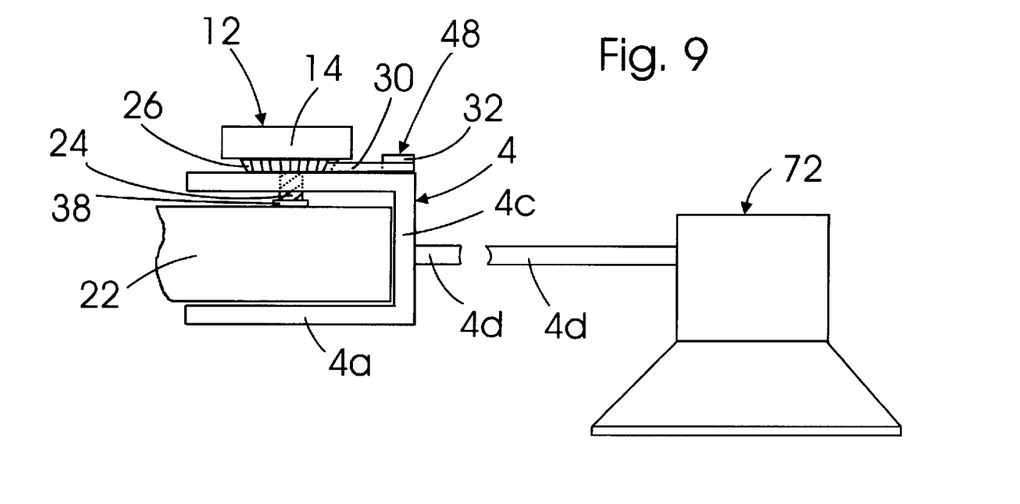
FIG. 9 is a side view of a screw fastener clamp fastening a lamp to a shelf.

The screw fastener clamp can be used to fasten a number of additional types of items to a number of different types of surfaces. For example, FIG. 9 shows a screw fastener clamp with a body member 4, screw fastener 12 and rachet latch 48 fastening a lamp 72 to a shelf 22.

Figure 10:
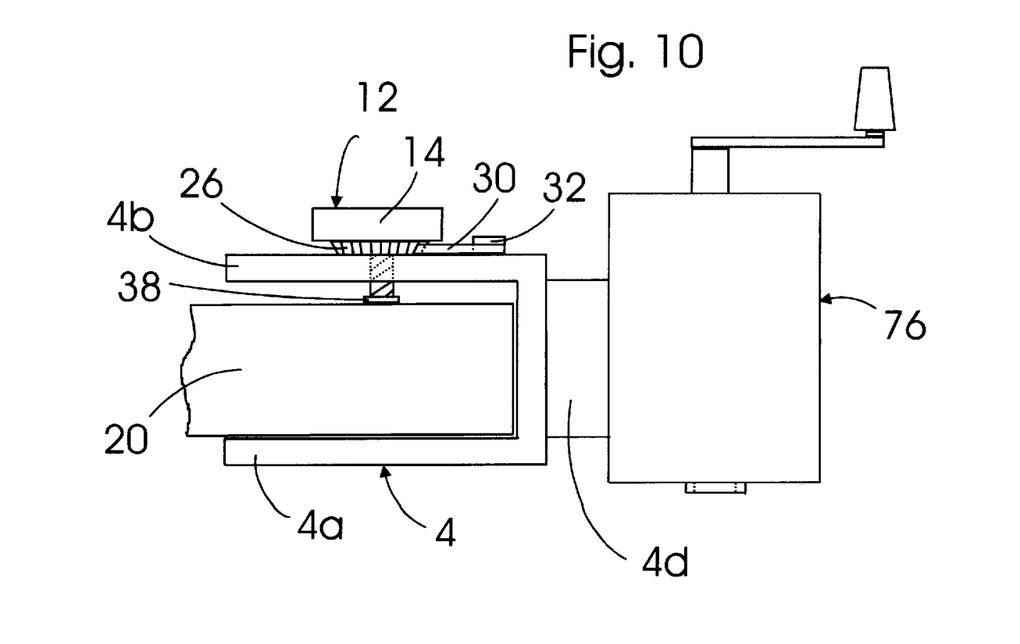
FIG. 10 is a top view of a screw fastener clamp fastening a pencil sharpener to the side of a bookcase.

FIG. 10 shows a screw fastener clamp with a body member 4, screw fastener 12 and latch 48 fastening a pencil sharpener 76 to the side of a bookcase 20.

Figure 11:
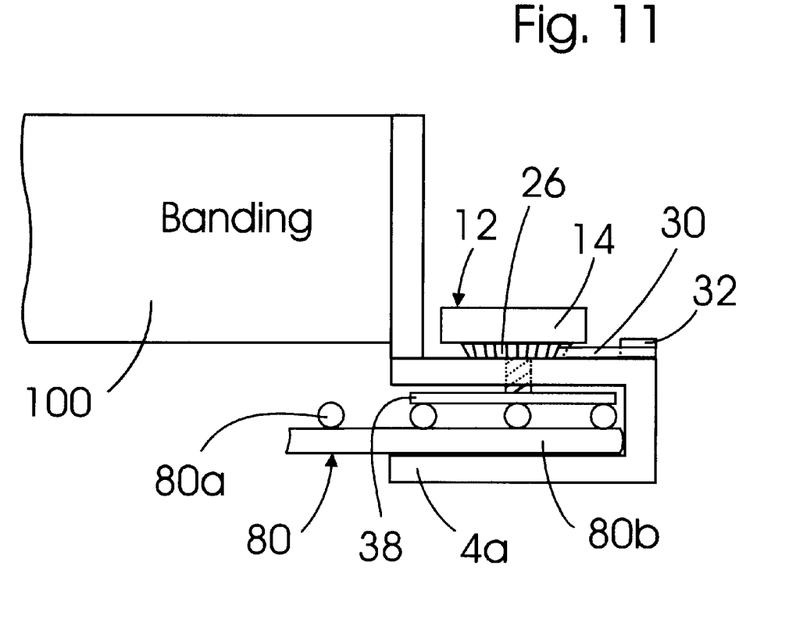
FIG. 11 is a side view of a screw fastener clamp fastening banding to a wire shelf.
Figure 12:
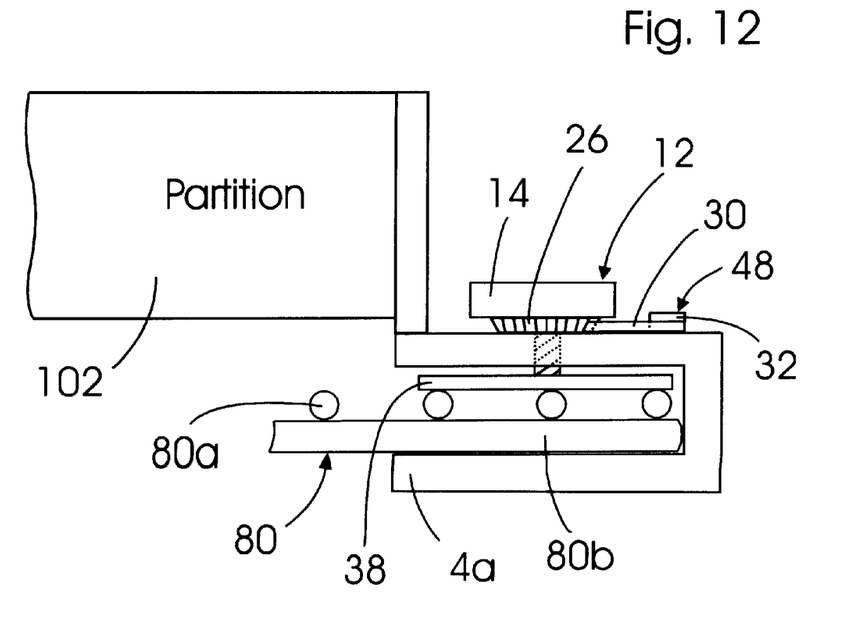
FIG. 12 is a side view of a screw fastener clamp fastening a partition to a wire shelf.

FIG. 11 shows a screw fastener clamp with a body member 4, screw fastener 12 and latch 48 fastening banding 100 to a wire shelf, while FIG. 12 shows a screw fastener clamp with a body member 4, screw fastener 12 and latch 48 fastening a partition 102 to a wire shelf.

Figure 13:
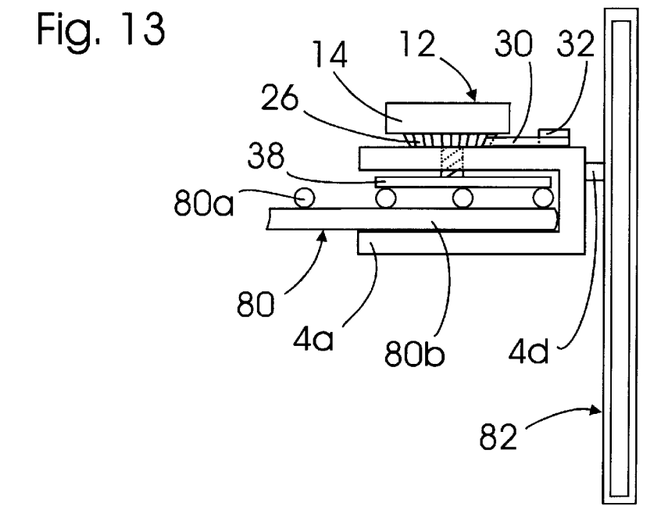
FIG. 13 is a side view of a screw fastener clamp fastening a sign holder to a wire shelf.

FIG. 13 shows a screw fastener clamp with a body member 4, screw fastener 12 and latch 48 fastening a sign holder 82 to a wire shelf 80. The wire shelf in FIGS. 11–13 is composed of cross wires 80a and less frequent support wires 80b. The screw fastener clamp can be mounted directly to the cross wires and/or support wires, with the pad 38 ensuring a good grip by spanning at least two of the shelf wires.

Figure 14:
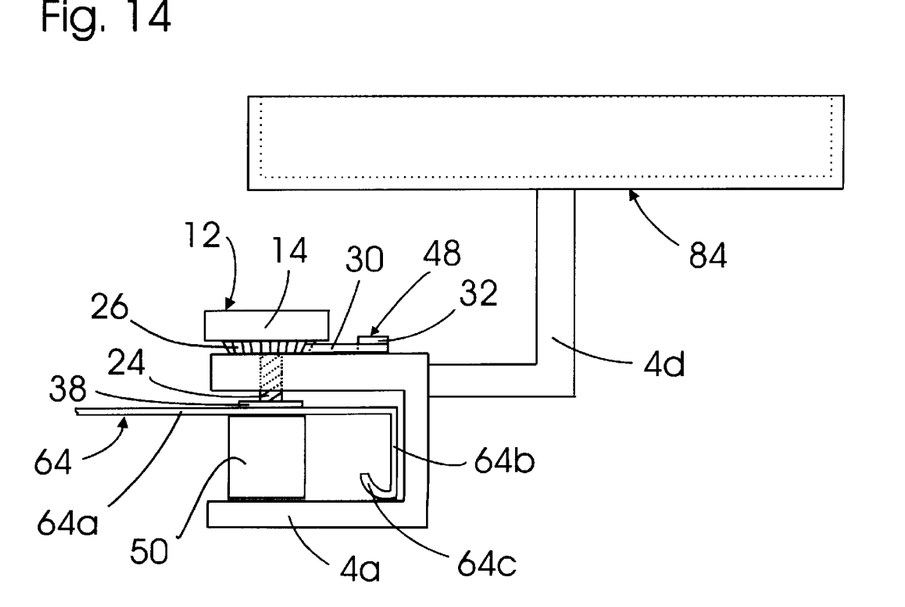
FIG. 14 is a side view of a screw fastener clamp fastening a tray to a metal shelf.
Figure 15:
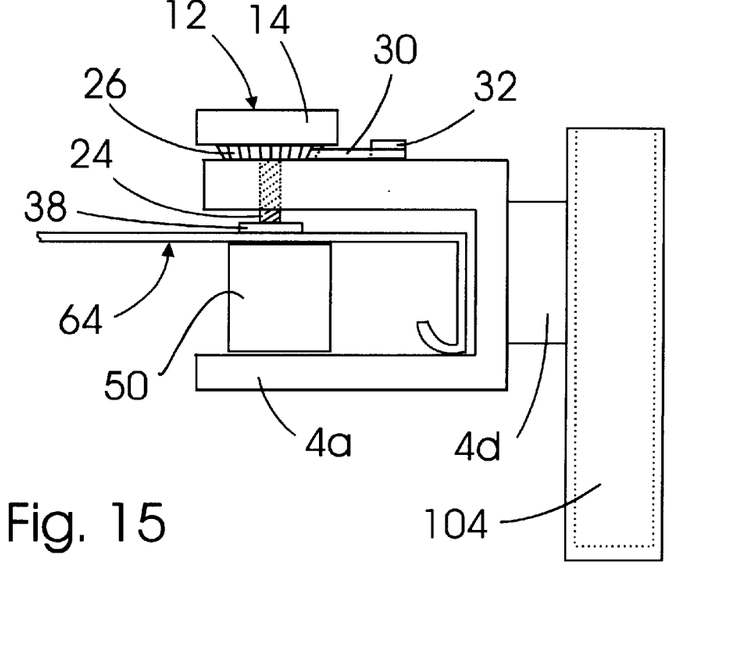
FIG. 15 is a side view of a screw fastener clamp fastening a dispenser to a metal shelf.

FIG. 14 shows a screw fastener clamp with a body member 4, screw fastener 12 and latch 48 fastening a tray 84 to a metal shelf 64, while FIG. 15 shows a screw fastener clamp with a body member 4, screw fastener 12 and latch 48 fastening a dispenser 104 to a metal shelf 64.

Figure 16:
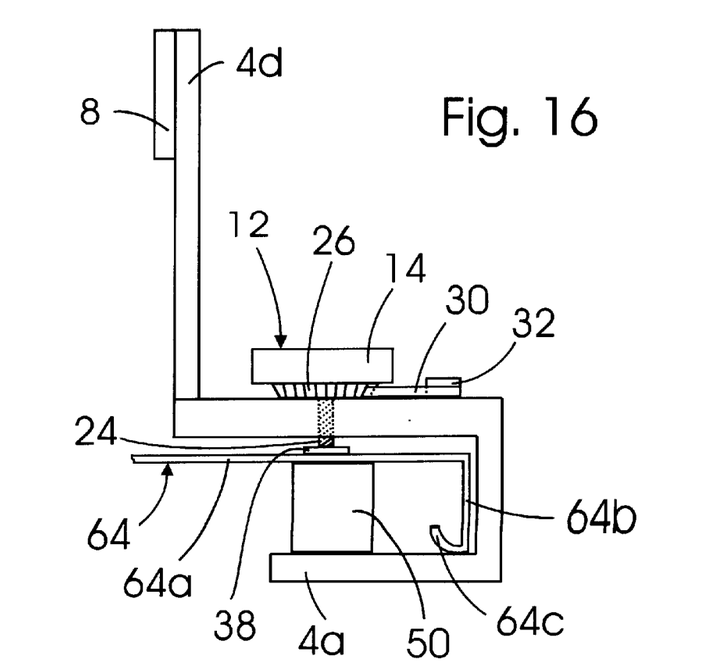
FIG. 16 is a side view of a screw fastener clamp fastening a book stop to a metal shelf.

FIG. 16 shows a screw fastener clamp with a body member 4, screw fastener 12 and latch 48 fastening a book stop member 8 to a metal shelf 64.

In FIGS. 14–16, a spacer pad 50 is provided between the lower leg portion 4a of the clamp and the metal shelf body 64a as needed to ensure a good fit. The use of said spacer pad ensures that the clamp can still have a good grip on the shelf even though the wide edge of said shelf prevents the lower leg portion of the body member from directly contacting the bottom of the shelf body. Said spacer pad, if desired, can be mounted with adhesive or other means to the lower portion of said metal shelf body.

Figure 17:
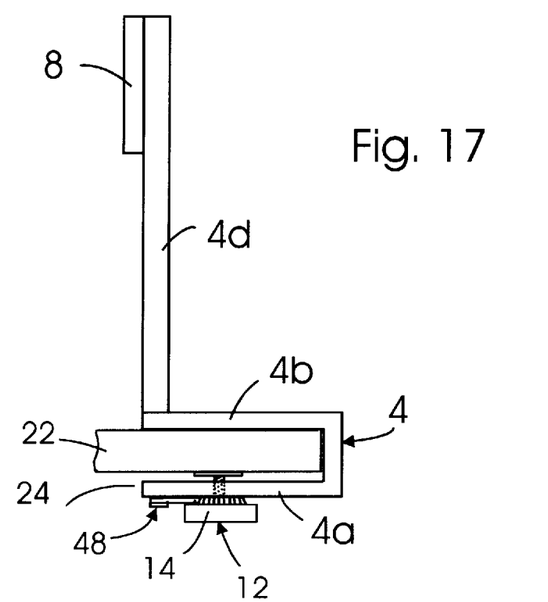
FIG. 17 is a side view of a screw fastener clamp having a book stop and with the screw fastener connected to the lower leg of the body member.

FIG. 17 shows a screw fastener 12 with a rachet latch 48 where the screw fastener stud 24 rotates in a threaded opening in the lower leg portion 4a. Although the favored embodiment is to have the screw fastener in the upper leg portion 4b, since this avoids having the screw fastener protrude below the shelf, some applications may require the use of the screw fastener in the lower leg portion, for example, if the top of the shelf is relatively inaccessible.

Figure 18:
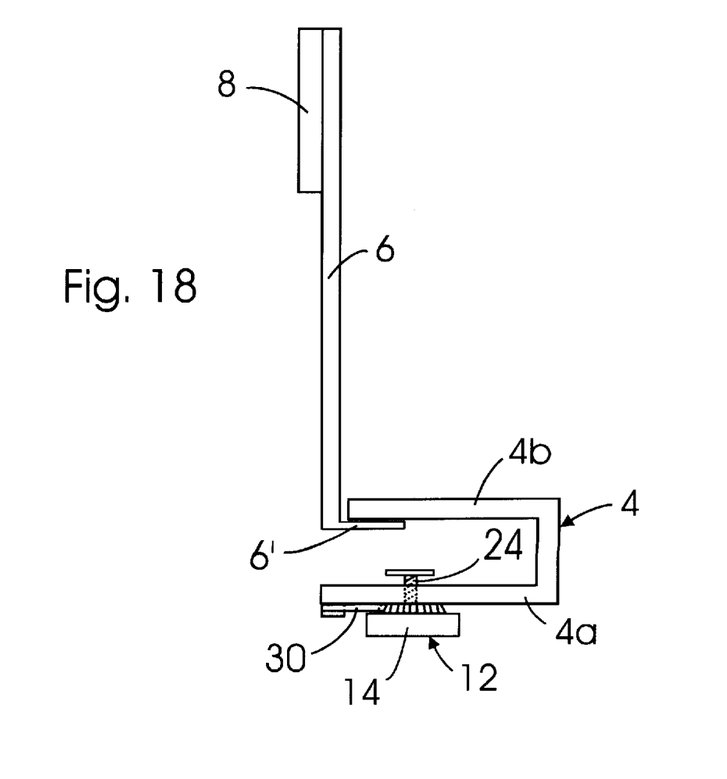
FIG. 18 is a side view of a screw fastener clamp with the retaining member and body member formed as two separate components.

FIG. 18 shows a screw fastener clamp with a book stop member 8, a retaining member 6, screw fastener 12, rachet latch 48, and a body member 4. In order for retaining member 6 and body member 4 to be separable, the retaining member is provided with an extension 6' that is located in slot 10 and abuts the underside of upper leg portion 4b. The retaining member is held in place by the screw fastener stud 24 pressing against the shelf (not shown). Having separable body member and retainer components allows a standardized body member 4 to be easily and inexpensively manufactured and different retaining members to be used interchangeably with the standardized body member. Having standardized components of simple construction which can be easily combined to meet different needs provides additional flexibility for shipping, storage, packaging, and display. In addition, this approach allows consumers to "mix and match" components as desired for a specific application.

Figure 19:
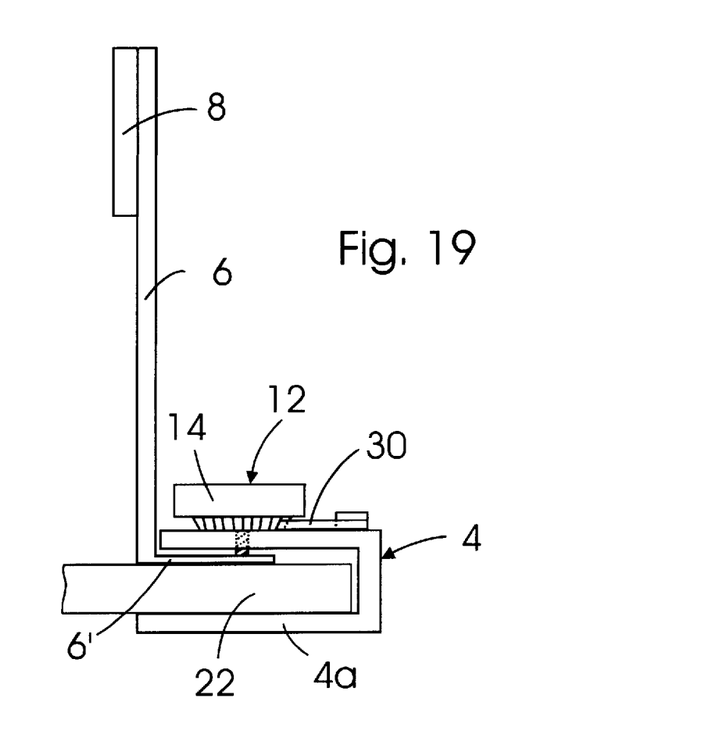
FIG. 19 is a side view of a screw fastener clamp with the retaining member and body member being formed as two separate components and having the screw fastener stud engaging said retaining member.

FIG. 19 shows a screw fastener clamp with a book stop member 8, retaining member 6, body member 4, and a screw fastener 12 with a rachet latch 48, with the screw fastener stud 24 engaging the extension 6' of said retaining member. As in FIG. 18, said extension 6' is located in slot 10 and abuts the underside of upper leg portion 4b. In this embodiment, the extension extends below said screw fastener stud so that rotating the screw fastener knob 14 in the direction that moves the stud into the slot 10 forces said stud against said extension 6' which, in turn, presses against the shelf 22 and thus forms a tight grip between the clamp and said shelf. Also, the extension distributes the pressure from said screw fastener stud and thus helps ensure said stud does not damage said shelf.

It will be recognized that the retaining member could consist of some types of existing bookends, for example, this embodiment of the screw fastener clamp could be used to stabilize existing classic "T-shaped" bookends and thus provide a low cost and effective solution for one of the principal drawbacks of these common bookends, i.e., their tendency to slide out of position.

Figure 20:
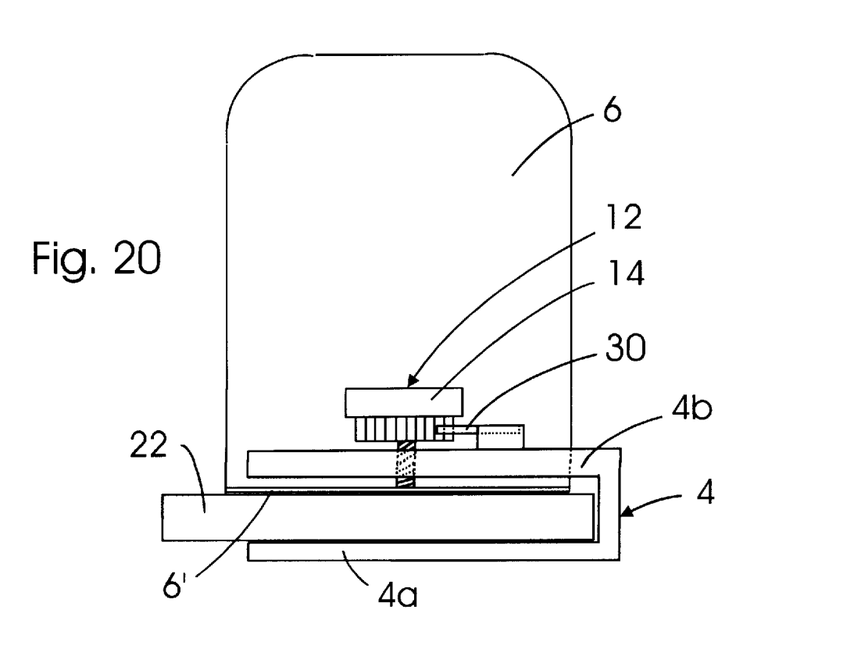
FIG. 20 is a side view of a screw fastener clamp with the retaining member and body member being formed as two separate components and having said body member with extended leg portions, the screw fastener stud engaging said retaining member; and further having a latch with a non-tapered ratchet wheel and spring.

FIG. 20 shows a screw fastener clamp with a retaining member 6 and body member 4 being two separate components, and a screw fastener 12 with a rachet latch engaging the extension 6' of said retaining member, but with said body member having extended leg portions so as to allow the screw fastener to be placed more toward the middle of the shelf and thus provide a tight grip on said retaining member when said retaining member is used to support a partitioning divider. This clamp is best suited for placement along the front or rear of a shelf, whereby the partition or divider extends across the length of the shelf. As noted above, such an arrangement is necessary, for example, with a bookcase having side walls which prevent placement of the clamp on the ends of the shelf.

The rachet latch shown in FIG. 20, like that in FIG. 3, consists of a non-beveled rachet wheel and spring, which, while less compact in form, allow for greater operational length of travel than a beveled rachet wheel and spring and thus would be preferred for applications involving shelving of varying thicknesses.

Figure 21:
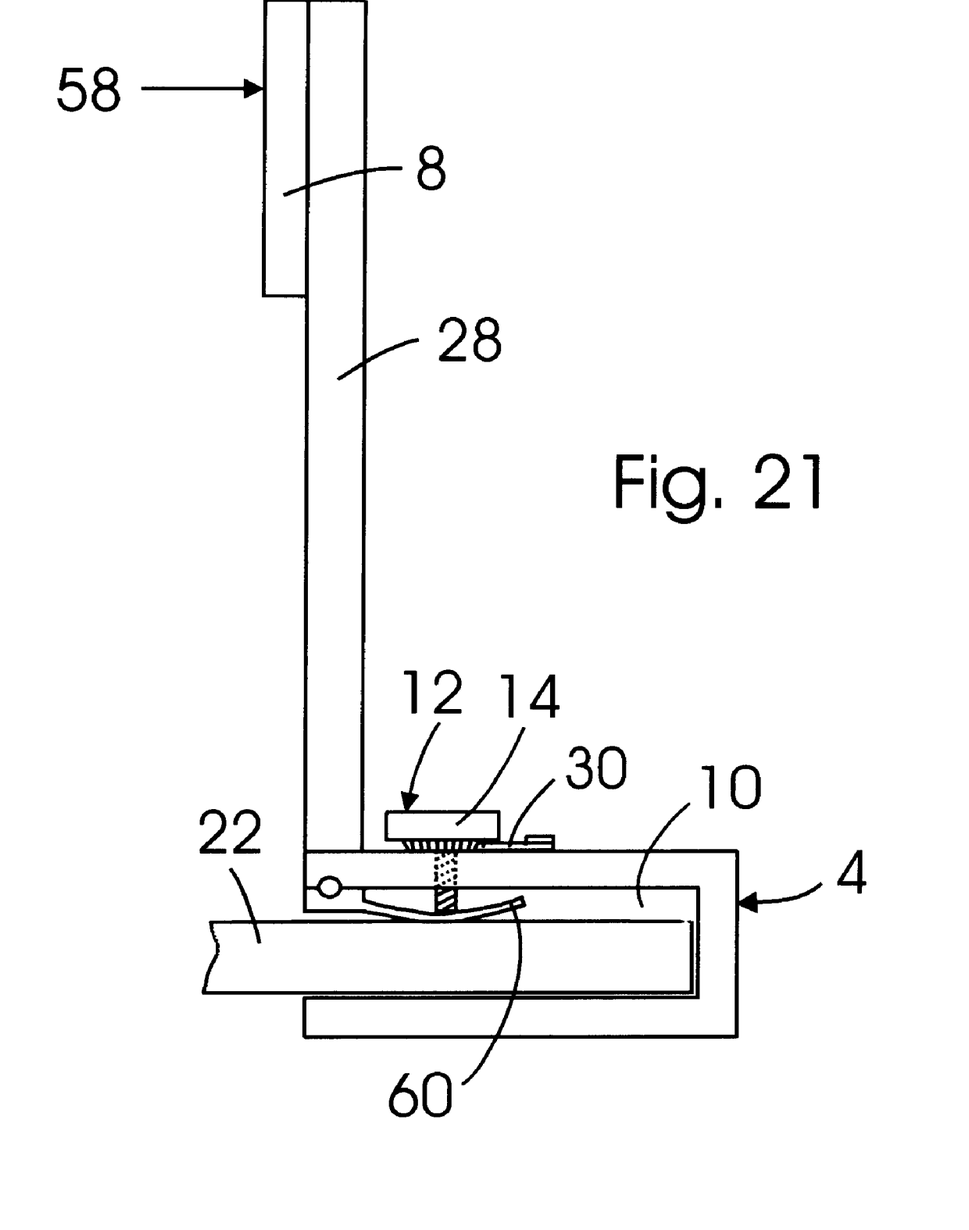
FIG. 21 is a side view of a screw fastener used with a clamping bookend having a flex portion at the lower end of the clamping member, where the screw fastener stud reversibly presses against said flex portion.

FIG. 21 shows a screw fastener 12 with a rachet latch used with a previously disclosed (Stuart U.S. Pat. No. 5,655,670) clamping bookend having a flex portion 60 at the lower end of the clamping member 28. Said screw fastener has a screw fastener stud 24 protruding through the upper leg portion 4b of the body member 4. Rotating said screw fastener reversibly presses said stud against said flex portion and thus presses said flex portion against the shelf 22. Use of the screw fastener thus increases the grip on the shelf, particularly under light loads.

The bookend having a clamping member 28, flex portion 60 and a screw fastener 12 with a rachet latch is installed as follows: When the clamping member 28 is in its lowered position and the screw fastener stud 24 is in the raised or unengaged position, flex portion 60 extends across slot 10. As the bookend is placed on the shelf 22, said clamping member rises to its upright position. The grip on the shelf is further increased by rotating the screw fastener knob 14 so that the stud extends into said slot, presses against said flex portion and, in turn, said flex portion presses against said shelf and wedges said shelf between said flex portion and the lower leg portion 4a of said body member. As disclosed for the clamping bookend in Stuart U.S. Pat. No. 5,655,670, once the bookend has been installed on the shelf, said flex portion serves to transmit a load, represented by arrow 58, applied to said clamping member to said shelf via pivot pin 66. The greater the horizontal load applied to said clamping member, the greater the clamping force applied to said shelf, and the less likely the bookend will slide off of the shelf.

Figure 22:
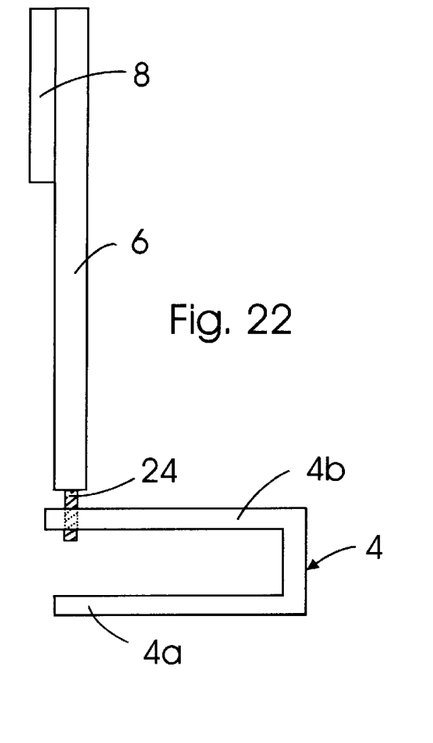
FIG. 22 is a side view of a screw fastener clamp with the body member and retaining member formed as two separate components and having a screw fastener stud at the lower end of said retaining member and a book stop member at the upper end of said retaining member.

FIG. 22 shows a screw fastener clamp with a book stop member 8, body member 4, and a screw fastener stud 24 at the lower end of a retaining member 6. As in FIGS. 1–3, said screw fastener stud rotates in a threaded opening in the upper leg portion 4b of the body member. In this embodiment, the retaining member 6 and the screw fastener stud 24 are formed as one unit and rotating said retaining member reversibly rotates said screw fastener stud and thus increases or decreases the grip of the clamp on the shelf. This embodiment allows a very tight connection, due to the amount of torque that can be developed by rotating said retaining member and also presents a cleaner appearance than the other embodiments having a screw fastener separate from the retaining member. If needed, shims or pads can be placed between said shelf and said screw fastener stud in order to insure that an appropriate grip is provided when said retaining member is in the appropriate position for supporting an item such as a book stop member or sign holder.

It will be recognized that the use of this embodiment for certain applications, for example, as a dividing partition, depends upon the use of the appropriate direction of the thread for the screw fastener (left or right-handed depending upon the application) or the provision of a latch (described above) to ensure that the screw fastener does not inadvertently rotate under load in a way that reduces the grip on the shelf.

Figure 23:
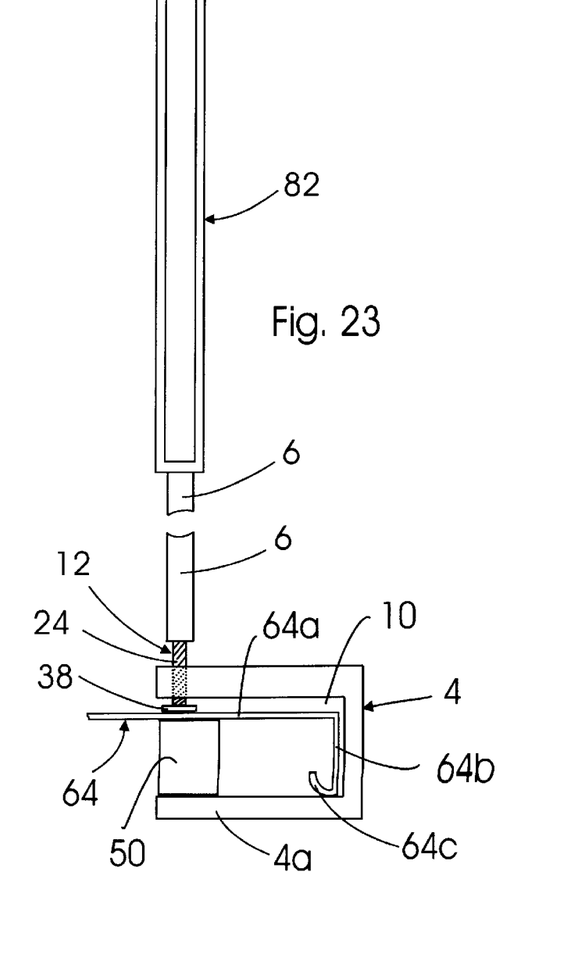
FIG. 23 is a side view of a screw fastener clamp fastened to a metal shelf with the body member and retaining member formed as two separate components and having a screw fastener stud at the lower end of the retaining member and a sign holder at the upper end of said retaining member.

FIG. 23 shows a screw fastener clamp with a body member 4, retaining member 6 and screw fastener stud 24, with the stud located at the lower end of said retaining member and fastening a sign holder 82 to a metal shelf 64. As in FIG. 22, the screw fastener stud 24 rotates in a threaded opening in the upper leg portion 4b of the body member 4 and said retaining member and said screw fastener stud are formed as one unit such that rotating said retaining member reversibly rotates said screw fastener stud and thus increases or decreases the grip of the clamp on said metal shelf. A spacer pad 50 is used as described above to ensure a good grip for the clamp on said metal shelf. A pad 38 is also provided between said screw fastener stud and said metal shelf in order to help prevent marring of the shelf surface and insure that a good grip is provided when said sign holder is in the appropriate position for display. Said pad is formed from polyethylene plastic or similar resilient material. Said pad has a larger surface area engaging the shelf as compared to the surface area of the engaging lower end of said screw fastener stud. Therefore, the pressure against said shelf is distributed over a larger surface area and the screw fastener does not mar or damage the surface of said shelf. It will be recognized that the grip on the shelf can also be enhanced by increasing the roughness of the pad surface that engages the shelf.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. A clamp which can be securely mounted along a shelf or similar structure, comprising:

(a) a body member having a retaining portion with supporting means and having a C-shaped configuration including a pair of generally parallel spaced leg portions and a connecting portion defining a slot for receiving the shelf;

(b) at least one screw fastener connected to one leg portion of said body member and having rotating means that reversibly protrudes a stud into said slot for movement between a disengaged position and an engaged position to securely fasten said body member to the shelf at a selected position thereon; and (c) a ratchet latch having latching means, said latching means consisting of a ratchet wheel attached to the stud and a spring which engages ratchet teeth of the ratchet wheel in the engaged position, for locking said stud into position as said stud is moved into the engaged position.

2. The clamp of claim 1, wherein said supporting means is selected from the group consisting of sign holders, lamps, dispensers, trays, signs, pencil sharpeners, book stops, partitions, and banding and binning.

3. The clamp of claim 1, wherein the ratchet wheel and spring are beveled.

4. The clamp of claim 1, and further comprising latch release means to allow said stud to rotate from the engaged position to the disengaged position.

5. The clamp of claim 4, wherein said latch release means consists of a pin which reversibly presses against the end of said spring nearest to said rachet wheel so that pressing upon said pin displaces said spring from the teeth of said rachet wheel.

6. The clamp of claim 4 and further comprising preventive means to prevent unauthorized use of said latch release means.

7. The clamp of claim 6, wherein said preventive means consists of a removable knob.

8. The clamp of claim 6, wherein said preventive means consists of a removable pin.

9. The clamp of claim 6, wherein said preventive means consists of a cover over said rachet wheel and spring.

10. A clamp which can be securely mounted along a shelf or similar structure, comprising:

(a) a body member having a C-shaped configuration including a pair of generally parallel spaced leg portions and a connecting portion defining a slot for receiving said shelf;

(b) at least one screw fastener connected to one leg portion of said body member and having rotating means that reversibly protrudes a stud into said slot for movement between a disengaged position and an engaged position to securely fasten said body member to said shelf at a selected position thereon; and (c) a retaining member with supporting means positioned between one of said leg portions and said shelf so that said retaining member is wedged between said shelf and said leg portion when said screw fastener is in the engaged position;

(d) a ratchet latch consisting of a ratchet wheel attached to the stud and a spring which engages ratchet teeth of the ratchet wheel to lock said stud in the engaged position.

11. The clamp of claim 10, wherein said supporting means is selected from the group consisting of sign holders, lamps, dispensers, trays, signs, pencil sharpeners, book stops, partitions, and banding and binning.

12. The clamp of claim 10, and further comprising latch release means to allow said stud to rotate from the engaged position to the disengaged position.

13. The clamp of claim 12, wherein said latch release means consists of a pin which reversibly presses against the end of said spring nearest to said rachet wheel so that pressing upon said pin displaces said spring from the teeth of said rachet wheel.

14. The clamp of claim 12 and further comprising preventive means to prevent unauthorized use of said latch release means.

15. The clamp of claim 14, wherein said preventive means consists of a removable knob.

16. The clamp of claim 14, wherein said preventive means consists of a removable pin.

17. The clamp of claim 14, wherein said preventive means consists of a cover over said rachet wheel and spring.

18. The clamp of claim 10, wherein said screw fastener stud engages an extension of said retaining member, and thus holds said retaining member in place and also helps ensure that said stud does not damage the surface of said shelf.

19. The clamp of claim 10, where said retaining member consists of a clamping member of a clamping bookend with a flex portion, with at least one screw fastener stud that protrudes through said leg portion to reversibly engage said flex portion and thus allow a tighter grip of said flex portion to the shelf.

20. A clamp which can be securely mounted along a shelf or similar structure, comprising:

(a) a body member having a C-shaped configuration including a pair of generally parallel spaced leg portions and a connecting portion defining a slot for receiving said shelf;

(b) at least one screw fastener connected to one leg portion of said body member and having rotating means that reversibly protrudes a stud into said slot for movement between a disengaged position and an engaged position to securely fasten said body member to said shelf at a selected position thereon; and said screw fastener further having a retaining portion with supporting means connected to said stud such that rotating said retaining portion rotates said stud and thus reversibly tightens the grip of said clamp on said shelf; and (c) a ratchet latch having latching means, said latching means consisting of a ratchet wheel attached to the stud and a spring which engages ratchet teeth of the ratchet wheel in the engaged position, for locking said stud into position as said stud is moved into the engaged position.

21. The clamp of claim 20, wherein said supporting means is selected from the group consisting of sign holders, lamps, dispensers, trays, signs, pencil sharpeners, book stops, partitions, and banding and binning.

* * * * *